Figure 1:
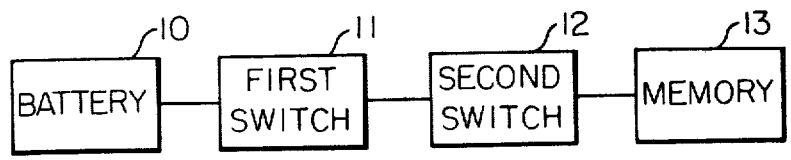

United States Patent [19]
Hosaka et al.

[11] 3,890,594
[45] June 17, 1975

[54] OPERATION RECORDER FOR MOTOR VEHICLE SAFETY DEVICE

[75] Inventors: Akio Hosaka; Kosaku Baba, both of Yokohama; Kiyoshi Wazawa, Fujisawa, all of Japan

[73] Assignee: Nissan Motor Company Limited, Yokohama, Japan

[22] Filed: Dec. 13, 1972

[21] Appl. No.: 314,523

[30] Foreign Application Priority Data
Feb. 9, 1972 Japan............................ 47-14118

[52] U.S. Cl............. 340/52 H; 307/10 R; 340/248 A
[51] Int. Cl................................................. G08b 21/00
[58] Field of Search............ 340/52 R, 52 H, 248 A, 340/262, 61, 214; 200/61.44, 61.45; 180/103; 307/10 R; 280/150 AB

[56] References Cited
UNITED STATES PATENTS

| | | | |
|---|---|---|---|
| 3,629,816 | 12/1971 | Gillund | 340/52 H |
| 3,654,412 | 4/1972 | Haruna et al. | 340/61 |
| 3,668,627 | 6/1972 | Brainerd | 340/52 H |
| 3,714,627 | 1/1973 | Dillman et al. | 340/262 |

*Primary Examiner*—John W. Caldwell
*Assistant Examiner*—Joseph E. Nowicki

[57] ABSTRACT

A first switch adapted to be driven from closed to open condition upon a collision being sensed, a second switch adapted to be driven from open to closed condition upon actuation of the safety device, and an electric fuse, which are connected in series across a battery. If the safety device is suddenly actuated without a collision condition being sensed, the second switch is closed with the first switch closed, so that the fuse is burnt out.

2 Claims, 2 Drawing Figures

PATENTED JUN 17 1975

OPERATION RECORDER FOR MOTOR VEHICLE SAFETY DEVICE

This invention relates to motor vehicle safety devices and, more particularly, to an operation recorder for recording the operation of a safety device to determine whether a collision of the vehicle is due to malfunction of the safety device or not.

Heretofore, many safety devices have been proposed for use on more vehicles. In certain of them, an inflatable confinement called the "gas bag" is provided which, at the time of a collision, is automatically expanded to a protective condition to avoid injuries including whip-lash injuries to the vehicle occupants. In protecting the occupants, the gas bag is spread out before the occupants so as to envelop their heads and shoulders, tending to obstruct the driver's sight. Thus, if the safety device of this type malfunctions, being suddenly actuated without a collision condition being sensed, then, since the driver's vesion is restricted, it may happen that the vehicle deviates from the intended course and comes into collision with another vehicle or a structure in the path of advance.

In this connection, it should be noted that in investigating a wrecked motor vehicle it is extremely difficult to attribute the accident to the malfunction of the safety device, since there may be substantially no difference in the conditions of the wreck between the above case, i.e., where a collision was brought about by the malfunction of the safety device and the one where the safety device was actuated properly, i.e., immediately after a collision condition being sensed. Thus, in an accident involving a motor vehicle equipped with a safety device of the above-mentioned type, there is a possibility that a trouble will arise between the occupants and the manufacturer in placing the responsibility for the accident.

Therefore, it is an object of the present invention to provide an operation recorder for recording the operation of a motor vehicle safety device to determine whether a collision of the vehicle is due to the malfunction of the safety device or not.

Another object of the present invention is to provide an operation recorder for a motor vehicle safety device which is capable of providing information on whether the safety device is actuated prior to or upon a collision of the vehicle.

It is a further object of the present invention to provide an operation recorder for a motor vehicle safety device which is relatively simple in construction and reliable in operation.

Figure 2:
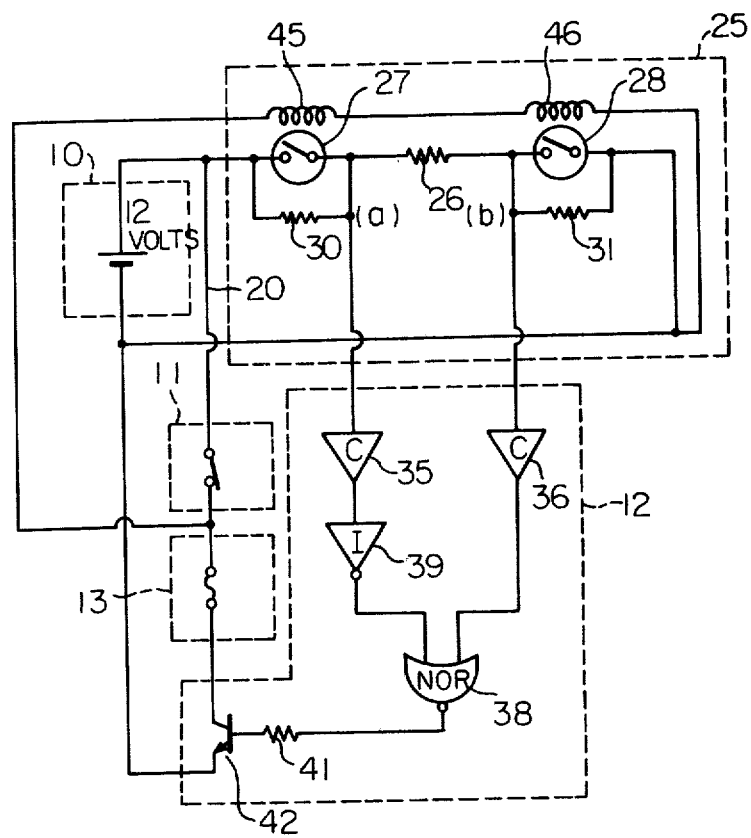

These and other objects will be readily apparent from the following description of the invention when read in conjunction with the accompanying drawing, in which:

FIG. 1 is a block diagram illustrating the principles of the operation recorder embodying the invention; and FIG. 2 is a circuit diagram of a typical example of the operation recorder shown in FIG. 1.

Referring now to FIG. 1, reference numeral 10 designates a d.c. power source or battery which is connected to a first switch means 11. The first switch means 11 operates in a manner that the state or condition of switching is reversed at the time of a collision and, in the illustrated embodiment, it is driven from closed to open position upon a collision of the vehicle. A second switch means 12 is connected in series with the first switch means 11 and is also operatively connected with a known safety device (not shown), such as an inflatable confinement, called the gas bag, adapted to be expanded to a protective condition at the time of a collision. The operation of the second switch means 12 is such that the state or condition of switching is reversed in response to actuation of the safety device. In this embodiment, the second switch means 12 is driven from open to closed position immediately when the safety device is actuated. Connected in series with the second switch means 12 is a memory means 13 which provides information on whether the safety device is actuated prior to or upon a collision of the vehicle, by determining whether or not a current flows thereinto from the battery 10 through the first and second switch means 11 and 12. If the safety device malfunctions, causing a sudden actuation of the gas bag prior to a collision, then the second switch means 12 is closed with the first switch means 11 closed, with the result that the current flowing through the first and second switch means 11 and 12 is recorded by the memory means 13. On the other hand, if the safety device is actuated upon a collision of the vehicle, then the first switch means 11 is opened before the second switch means 12 is closed, thus preventing a current from flowing into the memory means 13. Hence, as will be understood, on the basis of the presence or absence of a current flowing into the memory means 13, it can be determined whether the safety device is actuated upon or prior to a collision of the vehicle.

Referring to FIG. 2, there is illustrated a typical example of the operation recorder circuit of the present invention shown in FIG. 1.

The d.c. power source 10 is herein represented by a 12 volt battery, whose positive pole is connected through a line 20 to the first switch means 11 enclosed within a broken line rectangle. As previously described, the first switch means 11 is adapted to be driven from closed to open position upon a collision of the vehicle. For example, it may be of the impact-responsive type comprising an element of glass material or the like covered with an conductive coating, which element is liable to break into fragments due to an impact applied thereon at the time of a collision. The impact-responsive switch is mounted on a collapsible protruding portion of the vehicle, such as a bumper.

Shown as enclosed within a broken line rectangle 25 is a trigger mechanism for actuating the safety device (not shown), which mechanism includes an electrically actuable detonation element 26, and two collision sensors 27 and 28, connected in series across the battery 10. A single detonation element is herein shown for the sake of simplicity of illustration, the element 26 being electrically actuable to explode so as to release pressurized gas from a gas source for instantaneous inflation of the gas bag. The collision sensors 27 and 28 are of the type having an impact-responsive switch which is adapted to be closed in response to a collision condition of the vehicle.

Resistors 30 and 31 are respectively connected across their corresponding collision sensors 27 and 28 so as to enable the detection of a burn-out of the detonation element 26 caused to explode. The values of resistance of the resistors 30 and 31 and the detonation element 26 are so selected that $R_{30} = R_{31} \gg R_{26}$. Thus, at a time before the safety device is actuated, there is no appreciable voltage drop across the detonation element 26, i.e., the voltages at both points (a) and (b) are approximately 6 volts. On the other hand, if the safety device is actuated by exploding the detonation element 26, then, since the element 26 is burnt out, the voltages at points (a) and (b) become 12 and 0 volts, respectively.

Connected at points (a) and (b) is the second switch means 12 adapted to be driven from open to closed position upon actuation of the safety device, as described above. In this embodiment, the second switch means 12 includes two comparators 35 and 36 which are connected to the points (a) and (b), respectively, and have their respective reference levels equal to 8 and 4 volts. The output of the comparator 35 is connected to one input of a NOR gate 38 through an invertor 39 and, on the other hand, that of the comparator 36 is connected directly to another input of the NOR gate 38. The output of the NOR gate 38 is connected through a resistor 41 to the base of a transistor 42 whose emitter is connected to the negative pole of the battery 10. The collector of the transistor 42 is connected to the memory means 13 which, in the illustrated embodiment, is of a form of an electric fuse. The fuse 13 is in turn connected to the first switch means 11.

The operation of the second switch means 12 is as follows: when, as described above, the voltages at points (a) and (b) become 12 and 0 volts, respectively, due to burning-out of the detonation element 26 caused by the explosion, the comparator 35 produces a true "1" output because its reference voltage, i.e., 8 volts is exceeded by 12 volts applied at its input, while, on the other hand, the other comparator 36 produces a false "0" output because its reference voltage, i.e., 4 volts is greater than the input voltage of 0 volts. In this connection, it should be noted that the binary numerals "1" and "0" are herein used to denote that the unit is in the true and false states, respectively. The true "1" output of the comparator 35 is inverted by the invertor 39, so that a false "0" signal is supplied from the invertor 39 to one input of the NOR gate 38. The false "0" output of the comparator 36 is directly applied to the other input of the NOR gate 38. As is appreciated by those familiar with the art of logic circuits' design, with the false "0" signals supplied to both inputs of the NOR gate 38, there appears at its output a true "1" signal which is supplied to the base of the transistor 42, rendering it conductive. This means that the second switch means 12 is closed. If, at this moment, the first switch means 11 remains closed, which means that there has been no sensed collision condition of the vehicle, a current flows through the electric fuse 13, so that it burns out. Thus, it should be understood that when the safety device malfunctions, being actuated without a collision condition being sensed by the first switch means 11, the malfunction of the safety device is evidenced by the fact that the electric fuse 13 is found to have burned out. If the safety device is actuated in response to a collision condition of the vehicle, then, since the first switch means 11 is first opened, the electric fuse 13 fails to burn out even when the transistor 42 is rendered conductive.

Referring still to FIG. 2, the collision sensors 27 and 28 further include their respective coils 45 and 46 connected in series with the first switch means 11 across the battery 10. The function of the coils 45 and 46 is to normally maintain the collision sensors 27 and 28 in the open position so that they may not be closed due to, e.g., an effect of a rapid deceleration of the vehicle. When the first switch means 11 is opened upon a collision condition being sensed thereby, the coils 45 and 46 are de-energized, so that the operation of the collision sensors 27 and 28 is not affected by the coils.

Although a description of the invention has been made with the embodiment in which the first switch means 11 is driven from closed to open position upon a collision of the vehicle, while the second switch means 12 is driven from open to closed state upon actuation of the safety device, it will be appreciated that the switching conditions of both the first and second switch means 11 and 12 may be reversed. In this embodiment, the first switch means 11 may comprise two tape like contacts facing each other and mounted on a collapsible protruding portion of the vehicle, such as a bumper, from end to end. Since the first switch means 11 is normally open, while the second switch means 12 is normally closed, the electric fuse 13 is burnt out only when the first switch means 11 is first closed, i.e., in the case where the safety device is actuated when a collision takes place. It should be noted that the coils 45 and 46 are arranged to apply a force on the collision sensors 27 and 28 tending to urge them to be closed, when the first switch means 11 is closed at the time of a collision. By so doing, the sensitivity of the collision sensors 27 and 28 is highly increased.

Although many types of switches acting as the first switch means 11 are well known in the art, it will be appreciated that they can equally be employed in combination with other types of collision sensors, i.e., one characterized by remaining in the closed state for a short period at the time of a collision, memory means constructed of a thyristor, and a transistor switch capable of being closed or opened in accordance with the condition of the memory, without departing from the actual scope of the present invention.

Further, it will be appreciated that among other types of second switch means 12 which can be readily thought out by those skilled in the art are a pneumatically controlled switch adapted to be opened and closed in accordance with the pressure in a gas source for storing pressurized gas to be released to the gas bag, a thin conductive wire adapted to be broken upon actuation of the safety device, and a mechanical or electronic switch capable of sensing the movement of a gas bag when triggered into an inflated state.

Since what is required of the memory means 13 is the ability to memorize the fact that a certain voltage is established thereacross, it is understood that various types of memory means, such as semiconductor memory devices, can be employed instead of an electric fuse.

What is claimed is:

1. An operation recorder, which is used with a vehicle safety device triggering mechanism connected across a power source, to determine whether a safety device of a vehicle is actuated prior to a collision of the vehicle or not, said operation recorder comprising:
   normally closed on/off switch means connected across said power source and adapted to reverse its switch position in response to a collision of the vehicle;
   normally open on/off switch means connected in series with said normally closed on/off switch means across said power source, and including switch triggering means connected to said vehicle safety device triggering mechanism and adapted to detect the actuation of the safety device to reverse the switch position of said normally open on/off switch means;

recording means connected in series with said normally closed and normally open on/off switch means and responsive only to the actuation of said normally open on/off switch means prior to the actuation of said closed on/off switch means, thereby to record the sequence of the actuations of said normally closed and normally open on/off switch means, whereby said operation recorder is capable of recording whether said safety device is actuated prior to the collision of the vehicle.

2. The operation recorder as claimed in claim 1, wherein said safety device triggering mechanism comprises a first and a second collision sensor for sensing a collision of the vehicle, a detonation element, all of which are connected in series across said power source, and two resistors respectively connected across their corresponding collision sensors;

said normally open on/off switch means comprises a transistor connected in series with said normally closed on/off switch means and said recording means and having a base coupled to the output of a NOR gate having two inputs connected to a first comparator and an invertor respectively, said invertor being connected to a second comparator, said first comparator connected to a junction between said detonation element and said first collision sensor, and said second comparator connected to a junction between said detonation element and said second collision sensor, said transistor responsive to a collision of the vehicle thus being rendered conductive.

* * * * *